June 1, 1965    H. ALLEN    3,186,014
DEVICE FOR DIVERTING A PIPELINE SEPARATOR OR LIKE OBJECT
Filed July 19, 1963    2 Sheets-Sheet 1
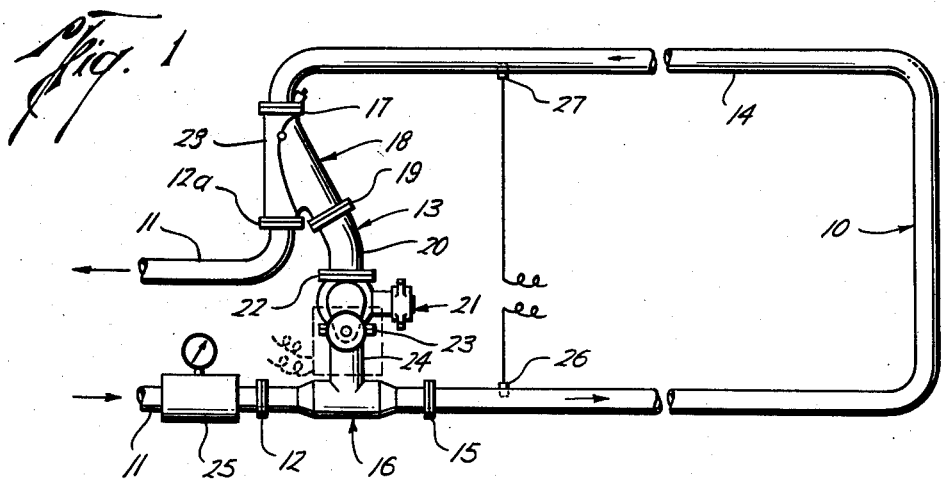
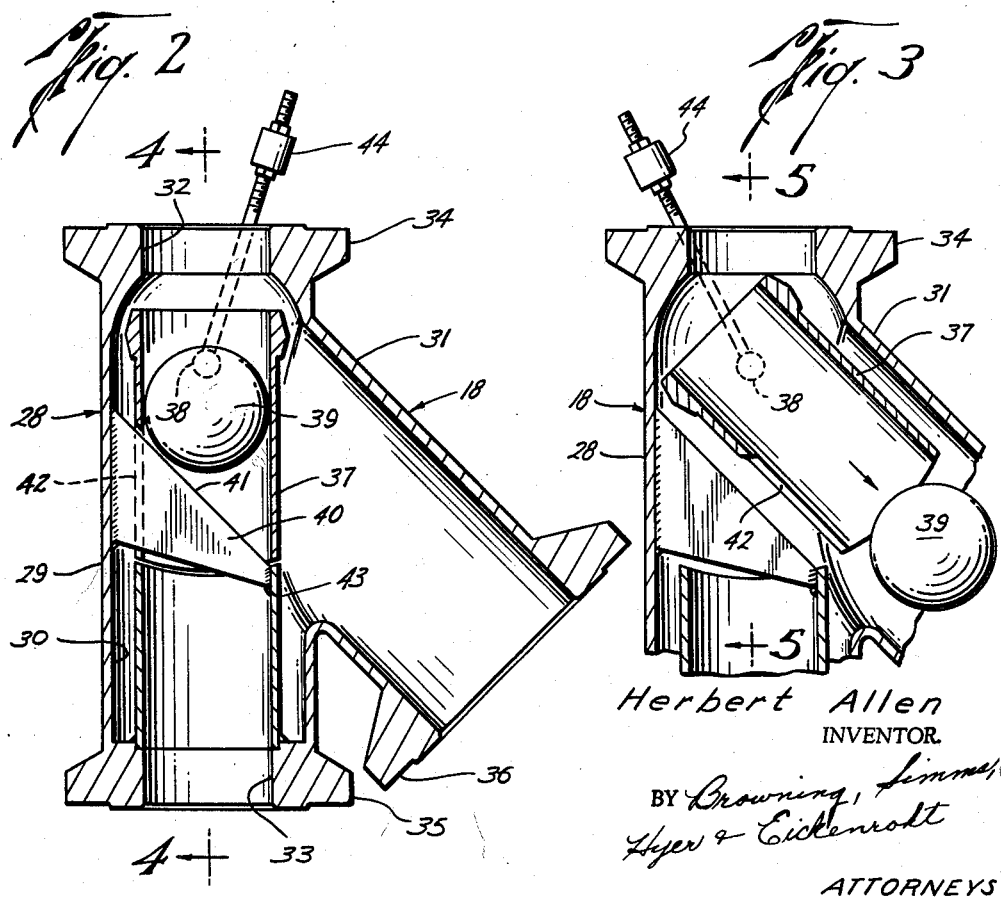
Herbert Allen
INVENTOR.
BY Browning, Simmons, Hyer & Eickenrodt
ATTORNEYS June 1, 1965 H. ALLEN 3,186,014
DEVICE FOR DIVERTING A PIPELINE SEPARATOR OR LIKE OBJECT
Filed July 19, 1963 2 Sheets-Sheet 2
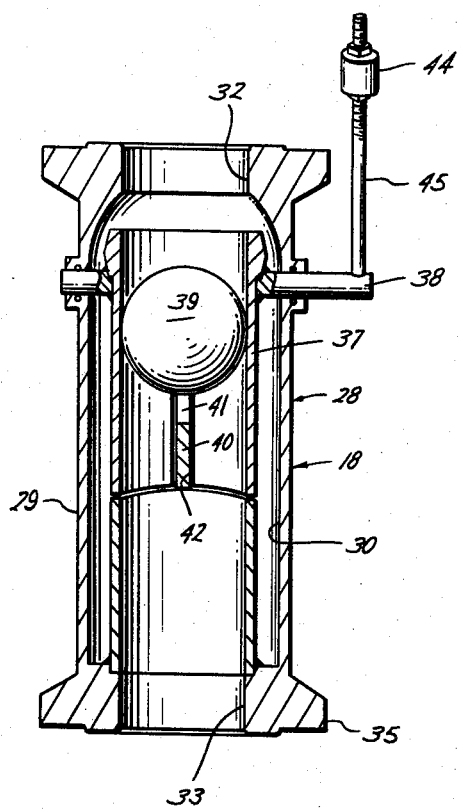
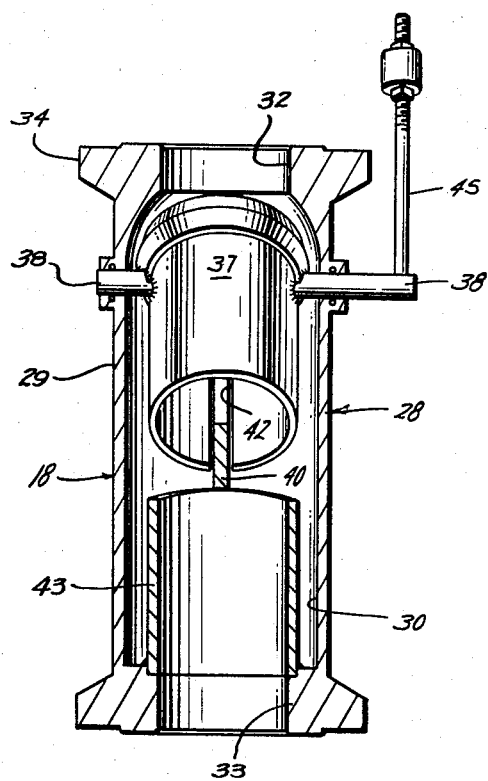
Herbert Allen
INVENTOR.
BY Browning, Simms,
Byer & Eickenroht
ATTORNEYS United States Patent Office 3,186,014
Patented June 1, 1965

3,186,014
DEVICE FOR DIVERTING A PIPELINE
SEPARATOR OR LIKE OBJECT
Herbert Allen, Houston, Tex., assignor to Cameron Iron Works, Inc., Houston, Tex., a corporation of Texas
Filed July 19, 1963, Ser. No. 296,893
8 Claims. (Cl. 15—3.51)

This invention relates to an improved device for diverting a separator or like object from within a pipeline into an opening in the side of the line.

A separator, which is often referred to as a "pig," is adapted to be propelled through pipelines in sliding engagement with the inner walls thereof for the purpose of cleaning them and/or separating batches of fluid within them. It is often necessary to divert the separator from the line without undue interruption of the normal flow through the line. For example, in one environment for which the device of this invention is particularly well suited, the separator is caused to traverse a loop in a pipeline for use in proving a meter disposed in the line. This circulation of the separator requires that it not only be launched into the loop, but also that it be diverted back into a position from which it may be retrieved for relaunching.

In a prior device of this type, a body having a flowway therethrough and a conduit connecting with a side of the flowway had the inlet to and outlet from its flowway connected in the pipeline at the downstream portion of the loop, and a grating was disposed across the flowway on the downstream or outlet side of the intersection of the conduit with the flowway. Thus, during most of the traverse of the separator through the loop, there was only minor obstruction as such to the flow of line fluid through the flowway, and, as the separator entered the inlet to the body of the device, it struck the grating and was thereby diverted into the conduit. The conduit was in turn connected to a bypass leading to the upstream portion of the loop and having a launching device disposed within it so as to retrieve and then relaunch the separator into the loop.

In conventional separator launching devices, a tubular body connected in the bypass of the loop contains a plug for receiving such a separator. This plug is rotatable within a flowway through the body between positions for launching the separator into the upstream portion of the loop, retrieving it from the downstream portion of the loop for subsequent launching, and permitting it to be inserted into or removed from the plug through a side opening in the launcher body. During the time the separator is traversing a measured portion of the loop, the flowway should be closed so as to prevent the bypass of fluid through the launching device, which would detract from the accuracy of the meter proving operation.

It was found that much of the debris within the line and pushed ahead of the separator was diverted into the bypass and thus caused to accumulate on the plug within the body of the launching device. This debris finds its way between the plug and the seating surfaces on the launcher body, particularly as the plug is rotated between its various positions. The resulting damage to these surfaces prevents the plug from sealing across the flowway so that some fluid will bypass the device and thereby impair the accuracy of the loop, as previously noted.

Although the grating of this earlier separator-diverting device provided only a minor obstruction to the flow of line fluid therethrough, such fluid was still free to flow into the conduit and thus into the bypass of the meter proving loop. Even with the separator-launching device in a position to close the bypass, this could cause sufficient turbulence of the flow through the pipeline so as to further interfere with the accuracy of the loop. Still further difficulty was encountered in fully diverting the separator into the conduit. That is, although the grating diverted the separator into the inner end of the conduit, it was found that the separator sometimes reached a state of equilibrium before passing through the conduit.

An object of this invention is to provide a device of this general type in which the conduit is shielded from much of the debris accumulated ahead of the separator, wherein substantially all of the fluid flow through the loop or other pipeline portion ahead of the device is confined for flow into the portion of the pipeline downstream of such device, and in which the separator is more positively directed into the conduit, and thereby more reliably caused to pass through the conduit.

Another object is to provide a device of the type above described which is simple in construction and inexpensive to manufacture.

Other objects, advantages and features of the invention will be apparent to one skilled in the art upon consideration of the written specification, the attached claims and the annexed drawings.

In the drawings, wherein like reference characters are used throughout to designate like parts:

FIG. 1 is an elevational view of a meter prover loop connected in a pipeline adjacent a meter for measuring flow therethrough and including a device constructed in accordance with the present invention for diverting a separator into a bypass connecting the downstream portion of the loop with a device for launching the separator into the upstream portion of the loop;

FIG. 2 is an enlarged vertical sectional view of such device with the separator received within a sleeve thereof as it first moves through the inlet to the device;

FIG. 3 is a view similar to FIG. 2, but wherein the sleeve of the device has swung to a position to permit the separator to move out of its lower end and into a conduit connecting with the body of the device;

FIG. 4 is a vertical sectional view of the device, as seen along broken line 4—4 of FIG. 2; and FIG. 5 is another vertical sectional view of the device, as seen along line 5—5 of FIG. 3, and with the sleeve therein shown in elevation.

With reference now to the details of the above-described drawings, a loop 10 is shown in FIG. 1 to have its upstream and downstream portions connected to a pipeline 11 by means of flanged couplings 12 and 12a, respectively, and to include a bypass 13 connecting such upstream and downstream portions. An intermediate run 14 of the loop is bent into a U shape having a lower end connected by a coupling 15 to one end of a T fitting 16 which has its opposite end connected to the pipeline by coupling 12. The upper end of the run 14 of the loop is connected by means of coupling 17 to the upper end of a Y fitting 18 which has one branch at its opposite end connected to the pipeline by the coupling 12a and the other branch thereof connected by a coupling 19 to an elbow 20 in the bypass 13. As will be described to follow, the fitting 18 has means therein for diverting a separator, traveling in the direction of the arrows of FIG. 1, from the upper downstream portion of the loop into the bypass 13, whereupon such a separator may be again launched into the fitting 16 in the upstream portion of the loop.

For this latter purpose, a device 21 is disposed in the bypass with its upper end connected by coupling 22 to the lower end of elbow 20 and its lower end connected by coupling 23 to a branch 24 of the T fitting 16. Thus, upon diversion by the device 18 into the bypass 13, the separator will enter the device 21 for relaunching through the branch 24 of the T fitting 16 into the upstream portion of the loop and then caused to traverse the loop by means of fluid flowing through the pipeline. In its preferred form, the device 21 is constructed in the manner shown in a copending application, Serial No. 296,202, filed July 19, 1963, by Herbert Allen, entitled "Pipeline Separator Launching Device," and assigned to the assignee of the present application.

As also shown in FIG. 1, a meter 25 is connected in the pipeline adjacent the upstream portion of the loop 10, and detectors 26 and 27 are disposed within the run 14 of the loop to permit a determination of the interval which the separator requires in traversing the portion of the loop between them. In this manner, the operator is enabled to determine the volume of flow of fluid through this portion of the pipeline, and thereby "prove" the meter 25 by comparing such volume of flow with the reading of the meter for the detected interval.

As best shown in FIGS. 2 to 5, the separator-diverting device 18 includes a body 28 having a tubular portion 29 providing a flowway therethrough with an inlet 32 thereto and outlet 33 therefrom at the opposite ends of the tubular portion 29. A conduit 31 of substantially the same inner diameter as the tubular portion 29 of the body connects with the flowway intermediate the inlet and outlet and extends at an acute angle with respect thereto, as measured between the axis of the conduit and the outlet end of the flowway axis.

There is a flange 34 about the inlet end of the body for connection to a similar flange on the end of pipe run 14 so as to make up the coupling 17 shown in FIG. 1, and there is a flange 35 about the outlet 33 from the flowway of the body which is adapted to be connected to a similar flange on the pipeline 11 so as to form the coupling 12a shown in FIG. 1. Still further, there is a flange 36 about the end of conduit 31 opposite to the end thereof connecting with the flowway 30, and this latter flange is adapted to be connected to a similar flange on elbow 20 in the loop bypass so as to form the coupling 19 as shown in FIG. 1.

A sleeve or tube 37 is carried within the body by means of trunnions 38 extending from opposite sides of the sleeve and through adjacent sides of the body portion 29, as shown in FIGS. 4 and 5, so as to permit swinging of the sleeve about an axis transverse to the axis of the flowway. More particularly, the trunnions rotate about an axis perpendicular to the intersection of the axes of the flowway 30 and conduit 31 so that the sleeve is swingable between a first position (FIGS. 2 and 4) in which it is axially aligned with the flowway 30 through the body as well as the inlet 32 and outlet 33 thereof, and a second position (FIGS. 3 and 5) in which it is axially aligned with the opening through conduit 31.

Although as shown in FIG. 2 the ball-shaped separator 39 fits rather closely within the sleeve, it has enough clearance therein to fall freely into the sleeve in the first position thereof and then, upon swinging of the sleeve into the position of FIGS. 3 and 5, to fall through the sleeve and out of its lower end into the conduit 31. Of course, the relatively tight fit of the separator within the sleeve will permit line fluid to act thereacross and supplement the gravitational force on the separator tending to move it into and through the sleeve.

A bar 40 extends into the flowway of the body at the lower end of the sleeve 37 for engaging the separator 39 after it moves into the sleeve. More particularly, the upper surface 41 of the bar extends at least substantially parallel to the axis of the conduit 31 and thus at the same acute angle with respect to the outlet end of the flowway axis. Thus, when the separator moves into the sleeve and onto the bar 40, the surface 41 of the bar will urge the right-hand side of the separator against the corresponding side of the sleeve. As shown in FIG. 2, this engagement of the separator with the sleeve is beneath the axis of rotation of the trunnion 38 so that the force due to the separator will swing the sleeve in a counterclockwise direction.

As will be understood from a comparison of FIGS. 2 and 3, the bar 40 is of sufficient length that it will continue to urge the separator against the sleeve for substantially the entire movement of the separator within the sleeve, and until the sleeve has almost reached its second position. Furthermore, the sleeve 37 is slotted at 42 to receive the bar 40 in the first position of the sleeve, so that the sleeve may extend for substantially the same length along all of its sides. As a result, the ball-shaped separator 39 will slide downwardly within the sleeve for a substantial distance beneath its initial engagement therewith. Thus, fluid flow will act upon the top of the separator and thereby urge the sleeve in a counterclockwise direction during better than half of the travel of the separator through the sleeve, whereby the momentum of the swinging of the sleeve will cause it to swing from the position of the sleeve at the time the separator moves out of it at least as far as the second position thereof shown in FIG. 3.

As previously mentioned, some difficulty has been encountered in the use of prior diverting devices in fully diverting the separator into the side conduit. In the device of the present invention, however, the sleeve 37 will normally be swung into at least the position of FIG. 3 before the separator is free to move out of its lower end and into the conduit 31. Furthermore, and as will be apparent from FIG. 3, the lower end of the sleeve will move into the intersection of the conduit with the flowway 30 through the body 29 as such sleeve swings into its second position, so that ordinarily the separator will be moved into the conduit 31 even though it should drop vertically out of the lower end of the sleeve. As a matter of fact, it is contemplated that the force of the line fluid acting over the upper side of the separator will in effect cause it to catapult out of the lower end of the sleeve, thereby insuring movement into the conduit 31 even though the sleeve does not move all the way into the second position prior to release of the separator.

In the first position of the sleeve 37, its upper end is disposed relatively near the inlet 32 to the flowway of the body and one end thereof extends at least substantially across the intersection of the conduit 31 with the flowway. Thus, in its first position, the sleeve will confine substantially all of the fluid flow within the pipeline, including debris, from the inlet 32 into the outlet 33.

This is even more true of the preferred embodiment of the invention, wherein the outlet 33 from the body includes a tubular extension 43 forming a continuation of that portion of the outlet within the flange 35 on the body. More particularly, the upper end of the tubular extension is disposed just beneath the lower end of the sleeve 37 in the first position of the sleeve, as can be seen in FIGS. 2 and 4. Thus, with the sleeve 37 being continuous from one end to the other, except for the slot 42, it forms with the tubular extension 43 a substantially uninterrupted continuation of the flowway between the inlet 32 and outlet 33.

When the device 18 is disposed with the flowway and sleeve 37 extending vertically, as illustrated, the sleeve normally assumes the first position of FIGS. 2 and 4. However, even if the fitting 18 were otherwise disposed, the edge 41 of the bar 40 would in many instances engage with the sleeve so as to locate it in the first position. Furthermore, other obvious arrangements may be employed for normally locating the sleeve in the first position, regardless of the orientation of the fitting or device 18 with respect to the ground level.

Preferably, both the lower end of the sleeve and the adjacent upper end of the tubular extension 43 of the outlet from the body are cut on concentric curved paths about the axis of rotation of trunnion 38, so that during swinging of the sleeve between the first and second positions, there will be no interference between the sleeve and tubular portion 43. As can also be seen from FIGS. 2 and 3, the end of the bar 40 away from the portion secured to body portion 29 is secured to the upper inside portion of tubular portion 43 just beneath its upper edge.

A counterweight 44 is connected by a rod 45 to the outer end of one of the trunnions 38 for swinging between the positions shown in FIGS. 2 and 3. In the first position of the sleeve, the counterweight 44 is disposed on the right hand side of the axis extending through the flowway of the body so as to urge sleeve 37 into its first position. However, upon swinging of the sleeve toward the second position of FIG. 3, counterweight 44 will move to a dead center position and then on to the left hand side of the axis of the flowway so as to then urge the sleeve into its second position. This urging, of course, supplements the force of the separator against the sleeve in a counterclockwise direction. However, the effect of the counterweight itself is not sufficient to hold the sleeve in the second position of FIG. 3, so that upon release of the separator into conduit 31, the sleeve will return under its own weight to the first position of FIG. 2, during which the counterweight moves back over dead center into a position on the right hand side of the axis through the flowway.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A device for diverting a separator or like object from within a pipeline, comprising a body having a flowway therethrough with an inlet and outlet for connection in the pipeline and having a conduit connecting with the flowway intermediate the inlet and outlet, a sleeve, means mounting the sleeve on the body for swinging between a first position within the flowway for confining substantially all of the flow from the inlet to the outlet thereof and receiving a separator from the inlet and a second position for permitting a separator received in the sleeve to pass therefrom into said conduit, means on the body to engage a separator received within the sleeve to cause said sleeve to be swung from said first to said second position, said sleeve being swingable from said second to said first position when the separator has passed out of it, and a counterweight connected to the sleeve mounting means for swinging between positions on opposite sides of a plane passing through the axis of the flowway and axis of rotation of the sleeve mounting means, so as to yieldably urge said sleeve into each of said first and second positions during the latter portion of the swinging of the sleeve toward each said position.

2. A device for diverting a separator or like object from within a pipeline, comprising a body having a flowway therethrough, an inlet at one end and outlet at the other end each for connection in the pipeline, a conduit connecting with a side of the flowway and extending therefrom at an acute angle with respect to the outlet end of the body, a sleeve mounted on the body for swinging through said acute angle between a first position within the flowway in which it forms a substantial continuation of the inlet and outlet and a second position in which it is disposed at least partly within, and forms a substantial continuation of said conduit, said sleeve having an opening therethrough of a size to receive a separator from the body inlet in one end when disposed in said first position and deliver said separator from its other end into the conduit when disposed in said second position, and means on the body for engaging a separator received therein and urging it toward the side of the sleeve adjacent to the conduit so as to induce swinging of the sleeve from said first toward said second position.

3. A device of the character defined in claim 2, wherein said means includes a bar having a separator engaging surface extending in a direction substantially parallel to the axis of said conduit.

4. A device of the character defined in claim 3, wherein said sleeve will engage with said bar to prevent swinging of the sleeve beyond said first position upon swinging from said second position.

5. A device for diverting a separator or like object from within a pipeline, comprising a body having a flowway therethrough with an inlet thereto and outlet therefrom for connection in the pipeline and a conduit connecting with a side of the flowway intermediate the inlet and outlet, a tube mounted within the body for swinging between a first position in which it is substantially aligned with the flowway so as to confine substantially all of the flow from the inlet to the outlet and to dispose one end thereof for receiving a separator from the inlet, and a second position in which it is substantially aligned with the conduit so that the separator within said tube is free to pass out of the other end thereof into said conduit, and a bar on the body disposed across the other end of the tube in the first position thereof and having a surface which extends at least substantially parallel to the axis of the conduit so that said tube will be swung from said first to said second position as the separator engages said surface upon receipt in the tube and is forced therethrough by the fluid flow through the flowway.

6. A device of the character defined in claim 5, wherein said one end of the tube is substantially adjacent the body inlet and the other end of the tube is substantially adjacent the body outlet in the first position of the tube.

7. A device of the character defined in claim 6, wherein the tube is of substantially the same length on all sides and there is a slot in its side opposite the conduit to pass over the bar.

8. A device for diverting a separator or like object from within a pipeline, comprising a body having a flowway therethrough with an inlet thereto and outlet therefrom connectible in the pipeline, a conduit connecting with a side of the flowway intermediate the inlet and outlet and extending therefrom at an acute angle, a tube having an opening therethrough of substantially the same size as the inlet and outlet, means pivotally mounting the tube on the body for swinging about an axis transverse to the flowway between a first position in which the ends of said tube are disposed in substantial alignment with and substantially adjacent to the inlet and outlet of the body so as to confine substantially all of the flow from the inlet to the outlet and dispose one end of the tube to receive a separator from the inlet, and a second position in which the tube is at least substantially aligned with the conduit with the other end thereof at least partially disposed within said conduit so as to deliver a separator received therein into the conduit, and a bar on the body disposed across the tube and having a surface thereon for engaging the separator received within the tube which extends at substantially the same acute angle as the conduit for urging the separator received within the tube into engagement with the side of the tube facing the conduit and spaced toward said other end of the tube from the pivotal axis of the tube mounting means, whereby the force of fluid flow on the separator within the tube will cause it to swing said tube from said first toward said second position, said side of the tube extending toward said other end for a substantial length beyond the engagement therewith of the separator so that said separator will slide along said side of the tube and thereby continue to swing the tube toward said second position as it moves through the tube.

References Cited by the Examiner

UNITED STATES PATENTS

| | | | |
|---|---|---|---|
| 1,713,672 | 5/29 | Meyers | 243—29 X |
| 3,047,020 | 7/62 | Barrett | 15—104.06 X |

FOREIGN PATENTS 305,395  5/18  Germany.

CHARLES A. WILLMUTH, *Primary Examiner.*